United States Patent [19]

Dobrowolski et al.

[11] Patent Number: 4,707,064
[45] Date of Patent: Nov. 17, 1987

[54] OPTICAL MIXING/DEMIXING DEVICE

[75] Inventors: Jerzy A. Dobrowolski; Elmer H. Hara, both of Ottawa, Canada

[73] Assignee: Canadian Patents and Development Limited, Ottawa, Canada

[21] Appl. No.: 882,426

[22] Filed: Jul. 7, 1986

[30] Foreign Application Priority Data

Jul. 16, 1985 [CA] Canada ................................. 486902

[51] Int. Cl.⁴ .............................................. G02B 6/28
[52] U.S. Cl. ............................. 350/96.19; 350/96.16; 350/96.18; 350/166; 350/173
[58] Field of Search ............... 350/96.16, 96.19, 96.18, 350/166, 173

[56] References Cited

U.S. PATENT DOCUMENTS

| | | | |
|---|---|---|---|
| 3,905,684 | 9/1975 | Cook et al. | 350/173 |
| 4,252,404 | 2/1981 | DiVita | 350/96.19 |
| 4,474,424 | 10/1984 | Wagner | 350/96.16 |
| 4,671,613 | 6/1987 | Buhrer | 350/166 |

*Primary Examiner*—John K. Corbin
*Assistant Examiner*—Martin Lerner
*Attorney, Agent, or Firm*—Francis W. Lemon

[57] ABSTRACT

An optical mixing/demixing device is provided comprising a series of solid, light transmitting blocks, each having opposed, front and rear parallel, planar faces, coated with optical interference multilayer coatings, and first and second light transmitting faces arranged one on each side of the front planar face. The blocks are packed side by side with a precision, light expanding and collimating lens on the first light transmitting face and further, similar precision lenses on each of the second light transmitting faces. The first and second light transmitting faces may also be coated with optical interference multilayer coatings that are pass band filters.

7 Claims, 8 Drawing Figures

OPTICAL MIXING/DEMIXING DEVICE

This invention relates to an optical mixing/demixing device.

A number of types of fiber optic mixing/demixing devices are presently used, multiplexer/demultiplexer devices, in the fiber optic communications. These fiber optic mixing/demixing devices use microlenses and a series of mirrors, comprising multilayer dielectric filters or concave gratings. A recent example of these devices is disclosed in U.S. Pat. No. 4,474,424, dated Oct. 2, 1984, by R. E. Wagner. A review of known devices is given by H. F. Mahlein in "Fiber-Optic Communication in the Wavelength-Division Multiplex Mode", Fiber and Integral Optics, Vol. 4, No. 4, 1983.

Disadvantages of these devices are high cost, comparatively low number of multiplexing (~3), comparatively high insertion loss (~6dB) and comparatively low crosstalk losses (~30dB). Part of the high cost arises from the fact that angular and positional alignment of various elements such as lenses, optical filters and fibers are very time consuming. Since the final performance of the device depends critically on these alignments, the fabrication of a device is labour intensive.

Part of the alignment problem can be solved by using precision injection molded lenses, but the problem of aligning the reflective surfaces still remains. Also, in order to achieve higher crosstalk losses, more filters might be used but this can result in additional complications to the alignment problem with the introduction of additional reflective surfaces as well as an increase in the insertion loss by the extra air-to-dielectric interfaces associated with the reflective surfaces.

There is a need for an optical mixing/demixing device with improved wavelength selectivity than that which has so far been obtainable without the attendant increase in insertion losses that are presently incurred.

According to the present invention there is provided an optical mixing/demixing device, comprising at least two filter blocks, each block comprising a solid, light transmitting body having opposed, front and rear reflection faces, a first light transmitting face is to one side of a front one of the planar faces, a second light transmitting face is to the other side of one of the planar surfaces, and a pair of optical interference multilayer coatings having the reflectance characteristics for reflectively rebounding light of a particular spectral region therebetween, one being on the front and the other on the rear planar surfaces with the optical interference multilayer coating on the rear planar surface aligned with the first light transmitting face and one of the optical interference coatings in line with the second light transmitting face, each pair of optical interference multilayer coatings having different spectral reflectance and spectral transmittance characteristics to those of the other pairs, the blocks being packed side by side, starting from a foremost block, with the first light transmitting faces of each block in line with one another and the first light transmitting face of each following block directly attached to an optical interference multilayer coating of the preceding block, a first lens directly attached to the first light transmitting face, and which will expand and collimate a light beam passing therethrough to that face, for each second light transmitting face a second lens directly attached thereto which will converge a collimated light beam passing therethrough from that face, the blocks being shaped, dimensioned and packed so that when the device is used in the demixing mode a light beam passing through the first lens is expanded and collimated and directed through the first light transmitting face, to traverse the foremost body at which point only a particular spectral region of the beam will be reflected internally within the first body by the optical interference multilayer coating on the rear planar surface to then reflectably rebound in zigzag fashion between the optical interference multilayer coatings on that block to finally exit from that block through the second light transmitting face and be converged by the second lens, while the remainder of the spectral region of the beam will pass through the optical interference coating on the rear surface of the foremost body to enter the first light transmitting face of the next body where a different spectral region of the beam is reflectively rebounded between the optical interference multilayer coatings in a similar manner, and so on with different spectral regions being reflectively rebounded through each succeeding body, and, when the device is used in the mixing mode light beams of different spectral regions are fed by the second lenses into the second light transmitting faces to exit mixed from the first light transmitting face through the first lens.

In some embodiments of the present invention nonreflecting coatings and/or pass band filters are provided on exposed surfaces of the optical interference multilayer coatings.

In yet other embodiments of the present invention, optical interference multilayer, filter coatings are provided on the light transmitting faces to filter unwanted spectral regions from passing through these faces.

Pass band filters may be provided on exposed surfaces of the solid, light transmitting bodies.

Pass band filters may be provided on exposed surfaces of the optical interference multilayer coatings A final, straight through light transmitting body may be provided having a first light transmitting face, a second light transmitting face in line with the first light transmitting face, an optical interference multilayer coating on the second face, and an expanding and collimating lens connected to the coating.

In the accompanying drawings which illustrate, by way of example, embodiments of the present invention, FIG. 1 is a schematic plan view of a demixing device in the form of a demultiplexer;

Figure 1:
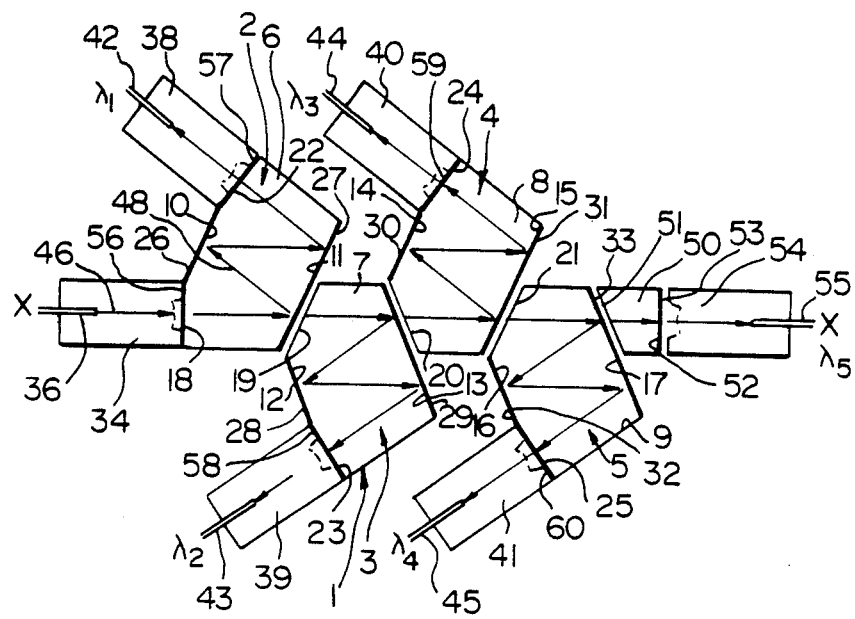

Referring now to FIG. 1, there is shown an optical mixing/demixing device generally designated 1, comprising four filter blocks generally designated 2 to 5, each block 2 to 5 comprising a solid light transmitting body 6 to 9 respectively, having opposed, front and rear parallel planar faces 10 to 17 respectively, and a first light transmitting face 18 to 21 is at one side of a front one of the planar faces, that is, planar faces 10, 12, 14 and 16, and a second light transmitting face 22 to 25 is at the other side of each of the planar surfaces 10, 12, 14 and 16 respectively. A pair of optical interference multilayer coatings, 26 and 27, 28 and 29, 30 and 31, 32 and 33, each pair having reflectance characteristics for rebounding light of a particular spectral region therebetween, one being on the front and the other on the rear planar surfaces, such as planar surfaces 10 and 11 of block 6, with the first light transmitting face 18 and optical interference coating 27 in line with the second light transmitting face 19. As previously stated, pairs of optical interference multilayer coatings, 26 and 27, 28 and 29, 30 and 31, 32 and 33 are provided, one being on the front, and the other on the rear planar surfaces, such as surfaces 10 and 11 of block 6, with the first light transmitting face 18 and optical interference coating 27 in line with the second light transmitting face 19. Each pair of optical interference multilayer coatings, such as 26 and 27, has different spectral reflectance and spectral transmittance characteristics from those of the other pairs. However, it should be noted that, in some embodiments of the present invention, the optical interference multilayer coatings 26 to 33 may all have different spectral reflectance and spectral transmittance characteristics from one another. A more detailed description of the functions of the optical interference multilayer coatings 26 to 33, and examples of particular embodiments thereof, will be described later. The blocks 2 to 5 are shaped, dimensioned and packed side by side, starting from the foremost block 2 for a beam of light to be transmitted in a manner which will also be described later. The first light transmitting faces 18 to 21 are in line with one another and the first light transmitting face of each following block 19 to 21 and 51 is directly attached to an optical interference multilayer coating 27, 29, 31 and 33 respectively of the preceding block. A first lens 34 is directly attached to the first light transmitting face 18 and will expand and collimate a light beam passing therethrough to that face 18 from an optical fibre 36. For each second light transmitting face 22 to 25 a second lens 38 to 41 is directly attached thereto which will converge a collimated light beam passing therethrough from those faces 22 to 25 respectively. The blocks 2 to 5 are packed so that when the device 1 is used in the demixing mode, a light beam passing through the first lens 34 is expanded and collimated and directed through the first light transmitting face 18, to traverse the foremost body 2 at which point only a particular spectral region of the beam will be reflected internally within the first body 2 by the optical interference multilayer coating 27 on the rear planar surface 11 to then reflectably rebound in zigzag fashion between the optical interference multilayer coatings 26 and 27 on that block to finally exit from that block through the second light transmitting face 22 and be converged by the second lens 38. The remainder of the spectral region of the beam will pass through the optical interference coating 27 on the rear surface 11 of the foremost body 2 to enter the first light transmitting face 19 of the next body 3 where a different spectral region of the beam is reflectively rebounded between the optical interference multilayer coatings 28 and 29 in a similar manner and be converged by the lens 39, and so on with different spectral regions being reflectively rebounded through each succeeding body 4 and 5 and converged by lenses 40 and 41.

When the device is used in the mixing mode, light beams of different spectral regions are fed by, for example, the second lenses 38 to 41 into the second light transmitting faces 22 to 25 to exit mixed from the first light transmitting face 18 through the first lens 34.

It should be noted that, while not essential, in this embodiment a final, solid, straight through a prism in the form of light transmitting body 50 is provided having the first light transmitting face 51 and a second light transmitting face 52 in line therewith, an optical interference multilayer coating 53 on the face 52, together with a lens 54 and an optical fiber 55 at its focus. The lens 54 and the optical interference multilayer coating 53 and the light transmitting faces 51 and 52 are all in alignment with the lens 34 to either receive a spectral region of a light beam therefrom, or to transmit a beam of a particular spectral region thereto.

The light beam 46 may comprise a multiplexed signal ($\lambda_1$, $\lambda_2$, $\lambda_3$, $\lambda_4$, and $\lambda_5$) delivered by a fiber to the lens 34 which is a precision lens block, by the optical fiber 36.

More specifically, in operation as a demultiplexer, a multiplexed input signal ($\lambda_1$, $\lambda_2$, ... $\lambda_5$) is delivered by the optical fiber 36 to the lens 34 which has precisely specified dimensions. The lens 34 expands and collimates the light from the fiber 36 to a beam of suitable diameter (e.g. 2 mm). By expanding the input signal, the demand on the accuracy of lateral alignment with respect to the optical axis is relaxed. The alignment of the tilt angle of the parallel faces 10 to 17 with respect to the optical axis XX becomes, however, more critical compared to the case of butting two optical fibers together. This problem is solved by directly butting the lens 34 to the first light transmitting face 18 of the block 2, the block 2 having precisely specified dimensions.

One of the wavelengths, $\lambda_1$, is separated out by the optical interference multilayer coatings 26 and 27, which may consist of many layers of dielectric films, and directed towards the lens 38 which couples the signal $\lambda_1$, to the optical fiber 42. Since the block 2 is precisely formed, the beam $\lambda_1$ is directed accurately to the lens 38 through multiple reflections. The selectivity of the wavelength $\lambda_1$ is improved at each reflection by the action of the optical interference multilayer coatings 26 and 27, and high crosstalk loss is thereby achieved. Since the reflections take place within the block 2 with no extra air-to-dielectric interfaces, the loss of signal power is kept to a minimum.

The block 3 for $\lambda_2$ operates on the same principle described above for block 2. The critical alignment between the blocks 2 to 5 and, if provided 50, to minimize the loss of signal power through misalignment is achieved by fabricating the blocks to precise dimensions and, as will be described later, by using mechanical alignment stops on a base plate for the entire assembly of blocks. The blocks 2 to 5 and, if provided 50, are placed in intimate contact with each other with an index matching adhesive in order to maintain precise alignment and to avoid air-to-dielectric interfaces. The lenses 34, 38 to 41 and 54 are also affixed by adhesives.

After $\lambda_3$ and $\lambda_4$ have been demultiplexed, the remaining signal $\lambda_5$ may, if desired, emerge through an additional filter (e.g. pass band or long pass or short pass) in the form of block 50, optical interference multilayer coating or coloured glass filter 52 and lens 54.

Antireflection coatings and/or additional filters can be provided on any exposed surface of the blocks as well as the light transmitting faces 18 to 21 and 51, 22 to 25 and 52, and the lens surfaces of the lens blocks 34, 38 to 41 and 54, to minimize Fresnel reflection losses or improve the wavelength selectivity.

Figure 2:
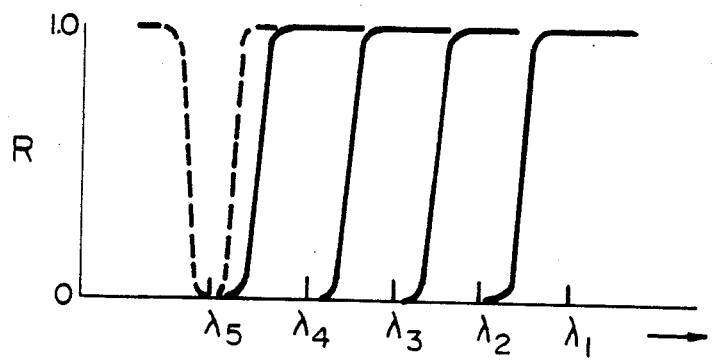
FIG. 2 is a graph of the spectral reflectance curves of the optical interference multilayer coatings in FIG. 1, when they are in the form of short wave pass filters.
Figure 3:
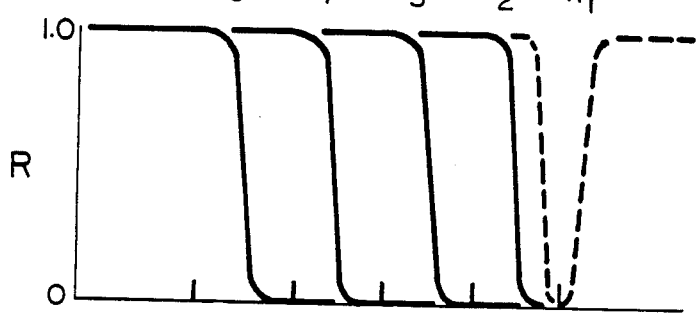
FIG. 3 is a graph of the spectral reflectance curves of the optical multilayer coatings in FIG. 1, when they are in the form of long wave pass filters.
Figure 4:
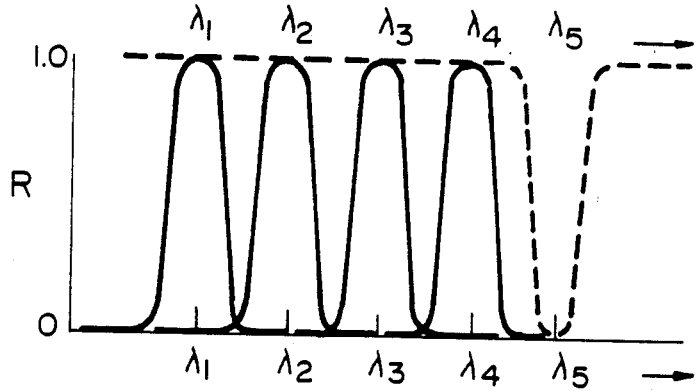
FIG. 4 is a graph of the spectral reflectance curves of the optical interference multilayer coatings in FIG. 1, when they are in the form of narrow band reflection type filters.

The characteristic type of optical interference multilayer coatings that might be used are shown in FIGS. 2, 3 and 4 where the reflectance R is plotted against the wavelengths $\lambda$. For demultiplexing $\lambda_1$ to $\lambda_5$, inclusively where $\lambda_1 > \lambda_2 > \lambda_3 > \lambda_4 > \lambda_5$, short wave pass optical interference multilayer coatings with the reflective characteristics shown in FIG. 2 can be used, the short wave pass characteristics being shown in continuous dark lines.

For demultiplexing $\lambda_1$ to $\lambda_5$ inclusively, where $\lambda_1 < \lambda_2 < \lambda_3 < \lambda_4 < \lambda_5$, long wave pass optical interference multilayer coatings with the reflective characteristics shown in FIG. 3 can be used, the long wave pass characteristics being shown in continuous dark lines.

In different embodiments, reflective type optical interference multilayer coatings with the reflective characteristics shown in FIG. 4 can be used.

If desired, a passband optical interference multilayer coating 52 with reflective characteristics shown in broken lines in FIGS. 2, 3 and 4 can be used for $\lambda_5$.

The blocks 2 to 5 may be slab-shaped while the lenses 34 and 381 to 41 and 54 may be, for example, square, rectangular or hexagonal in cross-section to facilitate alignment with one another.

It will be noted that in the embodiment shown in FIG. 1 spectral regions of decreasing wavelengths are sequentially filtered out along zigzag paths, extending along the same plane, but in opposite directions, through succeeding blocks. In some embodiments of the present invention the zigzag paths extend along planes which are angularly displaced from one another (e.g. five planes angularly displaced at 30° from one another) in order to facilitate the provision of unobstructed paths for the optical fibers, such as optical fibers 42 to 45.

If desired optical interference multilayer coatings 56 to 60 may be provided on the light transmitting faces 18 and 22 to 25 respectively to filter unwanted spectral regions from passing through these faces.

In FIGS. 5 to 8, similar parts to those shown in FIG. 1 are designated by the same reference numerals and the previous description is relied upon to describe them.

Figure 5:
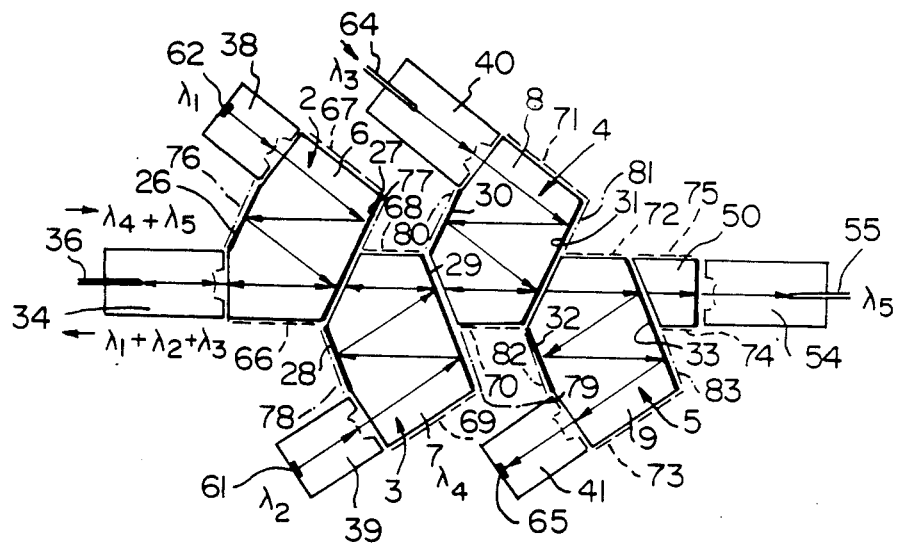
FIG. 5 is a schematic plan view of the mixing/demixing device of FIG. 1 being simultaneously used as a multiplexer/demultiplexer.

In FIG. 5 a device of the type shown in FIG. 1 is used as a multiplexer/demultiplexer simultaneously for bidirectional transmissions of signals $\lambda_1$, $\lambda_2$, $\lambda_3$, $\lambda_4$, and $\lambda_5$ and to show examples of various types of couplings that may be used. The light beam signals ($\lambda_2$ and $\lambda_2$) can originate from semiconductor light sources 61 and 62, or an optical signal ($\lambda_3$) can be fed by an optical fiber 64. A photodiode for detecting a light beam signal ($\lambda_4$) can also be used.

As shown in FIG. 5, non-reflecting coatings, such as those shown dotted and designated 66 to 75, may be provided on the exposed surfaces of the solid, light transmitting bodies 6 to 9 and 50.

Also, as shown in FIG. 5, non-reflecting coatings, such as those shown chain-dotted and designated 76 to 83, may be provided on the exposed surfaces of the optical interference multilayer coatings 26 to 33 respectively.

The coatings 66 to 83 may, for example, comprise a black paint or an optical interference, multilayer absorbing coating.

Alignment of the blocks 2 to 5 and 50, and lenses 35, 38 to 41 and 54 can be easily achieved with sufficient accuracy because these elements can be fabricated with high precision geometrically.

The mechanism by which this high cross talk loss is achieved in blocks 2, 3, 4 or 5 will now be explained with reference to FIGS. 6 and 7, wherein similar parts to those shown in FIGS. 1 and 5 are designated by the same reference numerals and the previous description is relied upon to describe them.

The total number of reflections within a block such as 4 to which the incident light is subjected to can either be odd or even. Schematic representations of these two cases are shown in FIGS. 6 and 7.

Figure 6:
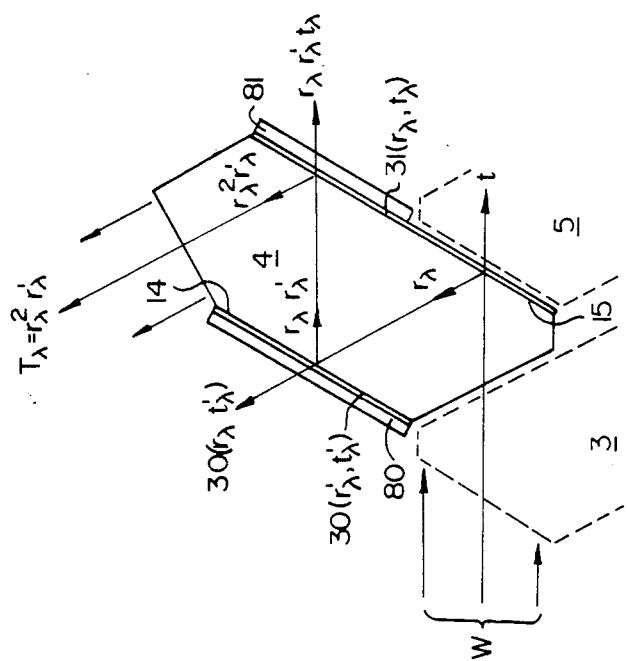
FIG. 6 is an enlarged, schematic plan view of a portion of the device shown in FIG. 1 and wherein the number of reflections is an odd number.

For example, in FIG. 6 let the rear surface 15 and front surface 14 of the block 4 be coated with optical interference multilayer coating 31 and 30, whose intensity reflectance and transmittance coefficients for a wavelength $\lambda$ are $r_\lambda$, $t_\lambda$ and or $r'_\lambda$, $t'_\lambda$, respectively. A collimated light beam of width W from the block 3, passing into the block 4, falls onto the rear planar surface 15. A fraction $r_\lambda$ of this incident light is reflected towards the front planar surface 14, and a fraction $t_\lambda$ is transmitted into the block 5. At the front planar surface 14 a fraction $r'_\lambda$ of the incident beam will be reflected towards the rear planar surface 15 so that the intensity of the reflected beam is now proportional to $r_\lambda r'_\lambda$. The front planar surface 14 will transmit an intensity of the incident beam proportional to $r_\lambda t'_\lambda$, which is absorbed in, for example, a black paint or absorber coating 80, if one is provided. At the rear planar surface 15 the twice reflected beam will once again be reflected. The intensity of this beam, directed towards the lens 40, will now be proportional to $r_\lambda^2 r'_\lambda$. The beam transmitted at this second incidence on the rear planar surface 15 will also be absorbed by, for example, a black paint or absorber coating 81, where provided.

Figure 7:
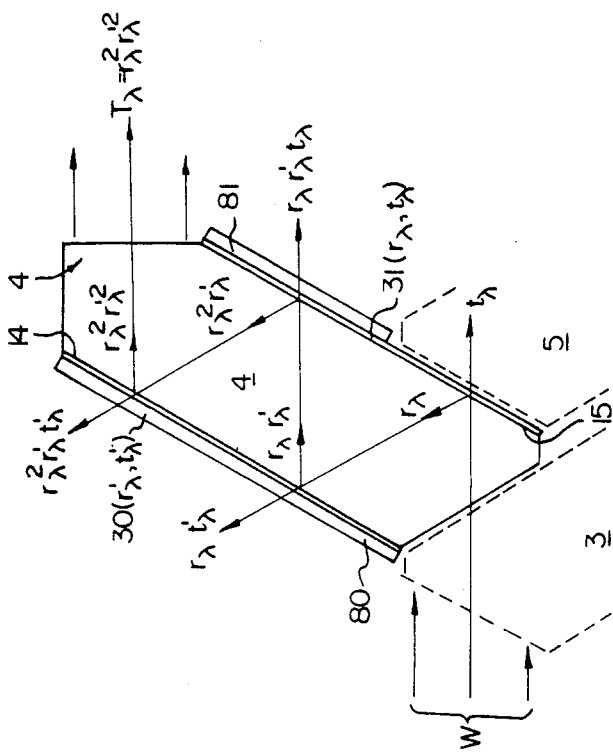
FIG. 7 is a similar view to that shown in FIG. 6, but of a device wherein the number of reflections is an even number.

The passage of the light beam within the block of FIG. 7 will be similar, except that it will undergo an additional reflection at the front planar surface 14. As a result the intensity of the light beam leaving this block will be proportional to $r_\lambda^2 r'^2_\lambda$.

Clearly, in general, at a wavelength $\lambda$ the transmittance $T_\lambda$ of a block, in which the incident radiation undergoes N reflections at the front planar surface and M reflections at the rear planar surface, will be given by $$T_\lambda = \pi(t_\lambda) \cdot (r_\lambda)^N \cdot (r'_\lambda)^M,$$

where $N = 0, 1, 2, 3$
where $M = N + 1$, if the total number of reflections is odd (FIG. 6), or $M = N$ if the total number of reflections is even (FIG. 7).

In the above, the quantity $\pi(t_\lambda)$ is the product of the transmittances of the rear planar surfaces of all blocks preceding the block under consideration.

The cross-talk loss within the block is the ratio of the transmittances $T_{\lambda R}$ at the wavelengths $\lambda_R$ of signals to be rejected to the transmittance $T_{\lambda S}$ at the signal wavelength $\lambda_R$:

$$\frac{T_{\lambda R}}{T_{\lambda S}} = \frac{\pi(t_{\lambda R})}{\pi(t_{\lambda S})} \cdot \left(\frac{r_{\lambda R}}{r_{\lambda S}}\right)^N \cdot \left(\frac{r'_{\lambda R}}{r'_{\lambda S}}\right)^M$$

The signal-to-noise (SN) ratio can be defined to be $T_{\lambda S}/\Sigma T_{\lambda R}$, where the summation is carried out over all signal wavelengths except $\lambda_S$. The insertion loss (IL) for the device is $(1-T_{\lambda S})$.

The above formulae still hold for the signal that passes straight through all the blocks, providing that $N=M=0$.

Schematic reflectance curves of three generic types of multilayer coatings that can be applied to the front- and back planar surfaces of the blocks - short wavelength pass (SWP) - long wavelength pass (LWP) - and narrow band reflection filters (NBR) - are shown in FIGS. 2, 3, 4 respectively. There are certain basic requirements that the multilayers must satisfy. For example, the multilayer coatings deposited onto the front- and back planar surfaces must reflect strongly light of the wavelength to be isolated by the particular block. In addition, the multilayer on the back planar surface should transmit light of all wavelengths that have not yet been selected. These requirements can be satisfied by several combinations of the filters shown in FIGS. 2, 3, 4. The types of multilayers used should further be selected to minimize the signal-to-noise ratio $T_{\lambda S}/(\Sigma T_{\lambda R})$ and the insertion loss $(1-T_{\lambda S})$.

For illustration purposes, calculated values of these quantities for a multiplexer/demultiplexer of the type shown in FIG. 1 are listed in Table I for several combinations of different optical interference multilayer coatings. For simplicity it has been assumed in the calculations that for every multilayer $r_\lambda=0.99$, $t_\lambda=0.01$ in the reflection region and $r_\lambda=0.01$, $t_\lambda=0.99$ in the transmission region. It has further been assumed that if light is incident in the direction indicated in FIG. 1, then $\lambda_1<\lambda_2<\lambda_3<\lambda_4<\lambda_5$.

It follows from Table 1 that the best results are obtained when narrow band reflecting coatings are applied to both planar surfaces. The signal-to-noise ratio for the signal which passes straight through all the blocks is much lower than those of the signals that are separated out by the blocks, and it depends only on the nature of the optical interference multilayer coatings applied to the rear planar surfaces. One can either ignore this output position, or else enhance the performance by using an auxilliary narrow band transmission filter 52 of the type indicated by the broken lines in FIGS. 2, 3 and 4.

The results given in Table I correspond to blocks in which the signal is reflected three times. By varying the number of reflections within a block, the performance of the modulator can be adjusted almost at will. For example, the cross-talk loss within a block coated with narrow band reflecting coatings (FIG. 4) for which $r_{\lambda S}=r'_{\lambda S}=0.99$ and $r_{\lambda R}=r'_{\lambda R}=0.01$ is $(T_{\lambda R}/T_{\lambda S})=10^{-2}, 10^{-4}, 10^{-6}, 10^{-8}\ldots$ for $(N+M)=1, 2, 3, 4\ldots$ respectively. Expressed in decibels, these quantities are 20, 40, 60, 80 . . . dB.

TABLE I

Calculated values of signal-to-noise ratios and insertion losses for signals of different wavelengths, for a multiplexer/demultiplexer of the type shown in FIG. 1, with representative combinations of optical interference multilayer coatings.

| Multilayer type back planar surface | front planar surface | λ1 SN | IL | λ2 SN | IL | λ3 SN | IL | λ4 SN | IL | λ5 SN | IL |
|---|---|---|---|---|---|---|---|---|---|---|---|
| 1 NBR | NBR | $2.4\times10^5$ | 0.03 | $3.2\times10^5$ | 0.04 | $4.8\times10^5$ | 0.05 | $9.7\times10^5$ | 0.06 | $2.5\times10$ | 0.04 |
| 2 NBR | LWP | $2.4\times10^5$ | 0.03 | $2.4\times10^5$ | 0.04 | $2.4\times10^5$ | 0.05 | $2.4\times10^5$ | 0.06 | $2.5\times10$ | 0.04 |
| 3 LWP | NBR | $2.4\times10^5$ | 0.03 | $9.8\times10^3$ | 0.04 | $9.7\times10^3$ | 0.05 | $9.7\times10^3$ | 0.06 | $9.8\times10$ | 0.04 |
| 4 LWP | SWP | $2.4\times10^3$ | 0.03 | $2.5\times10^3$ | 0.04 | $3.3\times10^3$ | 0.05 | $4.9\times10^3$ | 0.06 | $9.8\times10$ | 0.04 |
| 5 LWP | LWP | $2.4\times10^5$ | 0.03 | $9.7\times10$ | 0.04 | $9.9\times10$ | 0.05 | $9.9\times10^{0.06}$ | 9.8 $\times10$ | 0.04 | |

Figure 8:
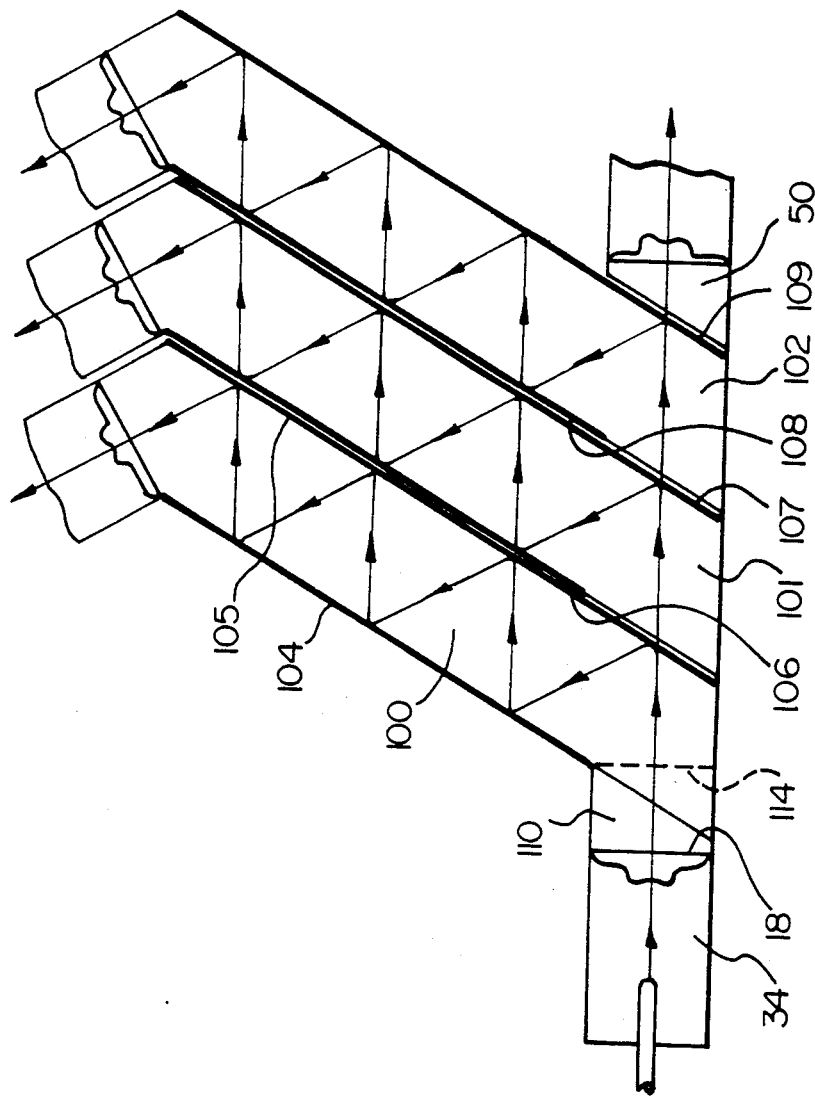
FIG. 8 is a schematic plan view of a mixing/demixing device of different configuration to that shown in FIGS. 1 and 5.

SN - signal-to-noise ratio
IL - insertion loss
NBR - narrow band reflector
LWP - long wave pass filter
SWP - short wave pass filter In FIG. 8, blocks 100 to 102 are similar in shape and are packed side by side to extend in the same direction and are each provided with a pair of wavelength selective optical interference multilayer coatings 104 and 105, 106 and 107, 108 and 109 respectively, and prisms 110 and 50.

In operation, the different spectral regions zigzag along the blocks 100 to 102 in the same general direction and exit therefrom along parallel paths in a similar manner to that described with reference to FIGS. 1 to 7.

In a different embodiment to that shown in FIG. 8 the block 100 is shaped with face 114 (shown dotted) and the lens 34 is directly attached thereto.

Examples of materials which may be used for the optical interference multilayer reflecting or antireflecting coatings or interference light absorbing coatings 26 to 33, 52 and 56 to 60, 66 to 83 are cryolite, NaF, LiF, $MgF_2$, $SiO_2$, $ThF_4$, $LaF_3$, $NdF_3$, $CeF_3$, $GeO_2$, $ThO_2$, $Al_2O_3$, MgO, $PbF_2$, $CeO_2$, $Sb_2O_3$, $HfO_2$, $Bi_2O_3$, $La_2O_3$, $Sc_2O_3$, $Nd_2O_3$, $Ta_2O_5$, SiN, $ZrO_2$, ZnS, $TiO_2$, Ag, Al, Au, Cu, Cr, Ge, Ni, NiCr, Si, Rh.

Examples of materials from which the solid, light transmitting bodies 6 to 9 may be made are those known in the art as optical glasses, fused quartz and optical plastics.

Suitable lenses for use as lenses 34, 38 to 41 and 54 are those marketed as high precision lenses by G, T and E, Massachusetts, U.S.A. and NSG New Jersey, U.S.A.

The filter blocks 2 to 5 and the lenses 34, 38 to 41 and 54 may be sealed together by optical adhesives, such as those obtainable from Eastman Kodak Co., Rochester, N.Y., U.S.A.

We claim:

1. An optical mixing/demixing device, comprising, at least two filter blocks, each block comprising a solid, light transmitting body having opposed, front and rear parallel, planar faces, a first light transmitting face is to one side of a front one of the planar faces, a second light transmitting face is to other side of one of the planar surfaces, and a pair of optical interference multilayer coatings, having reflectance characteristics for reflectively rebounding light of a particular spectral region therebetween, one being on the front and the other on the rear planar surfaces with the optical interference multilayer coating on the rear planar surface in line with the first light transmitting face and one of the optical interference coatings in line with the second light transmitting face, each pair of optical interference multilayer coatings having different spectral reflectance and spectral transmittance characteristics to those of the other pairs, the blocks being packed side by side, starting from a foremost block, with the first light transmitting faces of each block in line with one another and the first light transmitting face of each following block directly attached to an optical interference multilayer coating of the preceding block, a first lens directly attached to the first light transmitting face and which will expand and collimate a light beam passing therethrough to that face, for each second light transmitting face a second lens directly attached thereto which is similar to the first lens and which will converge a collimated light beam passing therethrough from that face, the blocks being shaped, dimensioned and packed so that when the device is used in the demixing mode a light beam passing through the first lens is expanded and collimated and directed through the first light transmitting face, to traverse the foremost body by the optical interference multilayer coating on the rear planar surface to then reflectably rebound in zigzag fashion between the optical interference multilayer coatings on that block to finally exit from that block through the second light transmitting face and be converged by the second lens, while the remainder of the spectral region of the beam will pass through the optical interference coating on the rear surface of the foremost body to enter the first light transmitting face of the next body where a different spectral region of the beam is reflectively rebounded between the optical interference multilayer coatings in a similar manner, and so on with different spectral regions being reflectively rebounded through each succeeding body, and when the device is used in the mixing mode light beams of different spectral regions are fed by the second lenses into the second light transmitting faces to exit mixed from the first light transmitting face through the first lens.

2. A device according to claim 1, wherein non reflecting coatings are provided on exposed surfaces of the solid, light transmitting bodies.

3. A device according to claim 1, wherein non reflecting coatings are provided on exposed surfaces of the optical interference multilayer coatings.

4. A device according to claim 1, wherein optical interference multilayer, filter coatings are provided on the light transmitting faces to filter unwanted spectral regions from passing through these faces.

5. A device according to claim 1, wherein pass band filters are provided on exposed surfaces of the solid, light transmitting bodies.

6. A device according to claim 1, wherein pass band filters are provided on exposed surfaces of the optical interference multilayer coatings.

7. A device according to claim 1, wherein a final, straight through light transmitting body is provided having a first light transmitting face, a second light transmitting face in line with the first light transmitting face, an optical interference multilayer coating on the second face, and an expanding and collimating lens connected to the coating.

* * * * *